United States Patent [19]

Staffin et al.

[11] 4,068,389
[45] Jan. 17, 1978

[54] GAS-DIFFUSION PLATE FOR FLUIDIZED BED APPARATUS

[75] Inventors: H. Kenneth Staffin; Robert Staffin, both of Colonia, N.J.

[73] Assignee: Procedyne Corporation, New Brunswick, N.J.

[21] Appl. No.: 677,466

[22] Filed: Apr. 15, 1976

[51] Int. Cl.² ............................................. F26B 17/00
[52] U.S. Cl. .................................. 34/57 A; 55/390; 138/42; 138/46
[58] Field of Search .................. 138/43, 40, 42, 46; 210/293; 55/34, 77, 390; 23/284; 34/57 A

[56] References Cited

U.S. PATENT DOCUMENTS

| | | | |
|---|---|---|---|
| 1,813,979 | 7/1931 | West | 138/43 |
| 1,980,085 | 11/1934 | Perry et al. | 138/43 |
| 2,405,927 | 8/1946 | Tornblom | 138/42 |
| 2,460,407 | 2/1949 | Andrus | 138/43 X |
| 3,143,145 | 8/1964 | Kauss | 138/43 |
| 3,498,462 | 3/1970 | Larrowe et al. | 210/293 X |
| 3,840,209 | 10/1974 | James | 138/43 |
| 3,841,354 | 10/1974 | McDonnell | 138/43 |

Primary Examiner—Charles E. Phillips
Attorney, Agent, or Firm—Leonard S. Knox

[57] ABSTRACT

The present disclosure relates to a diffusion plate to partition one space from another and pass a gas through ports in the plate in a flow pattern which is uniform over the area of the partition. Specifically, the disclosure relates to a diffusion plate, sometimes referred to as a distributor plate, having the aforesaid functions in connection with fluidized bed apparatus.

4 Claims, 6 Drawing Figures

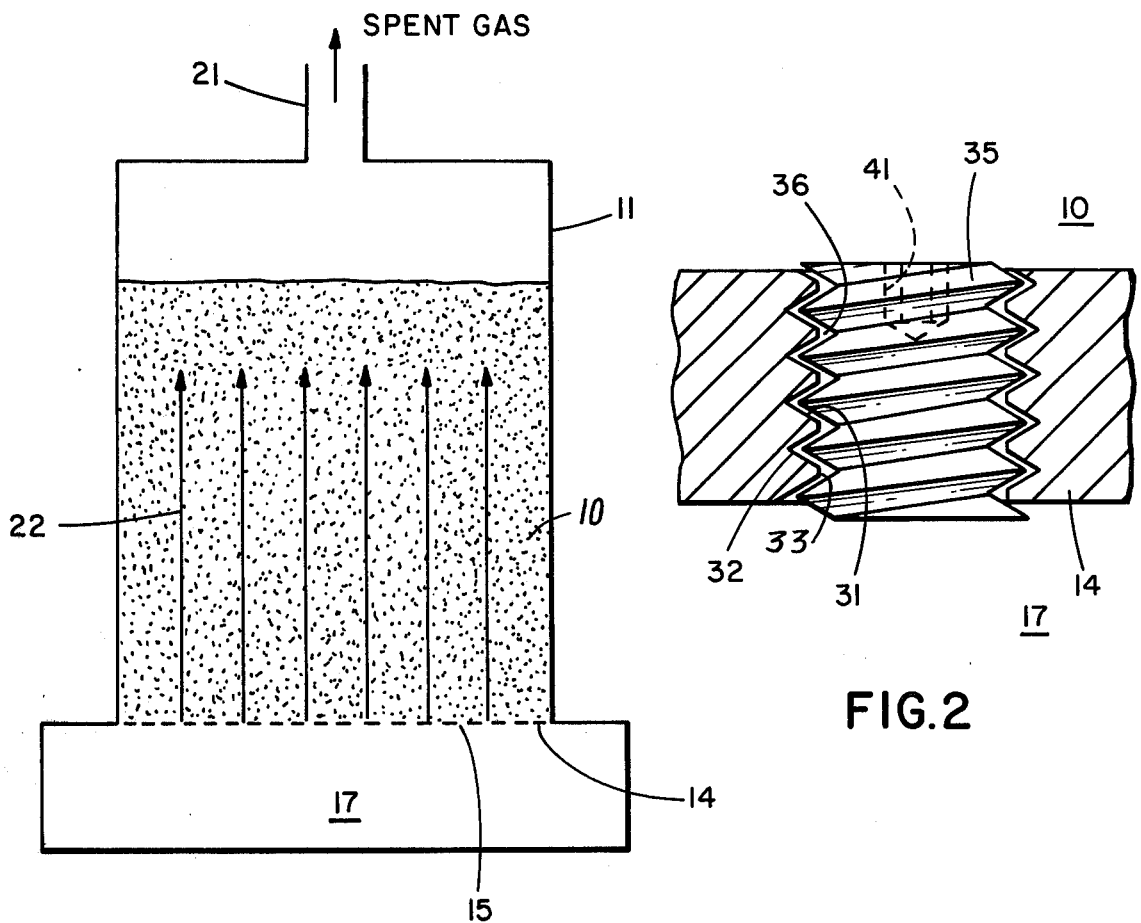
FIG. 1
FIG. 2
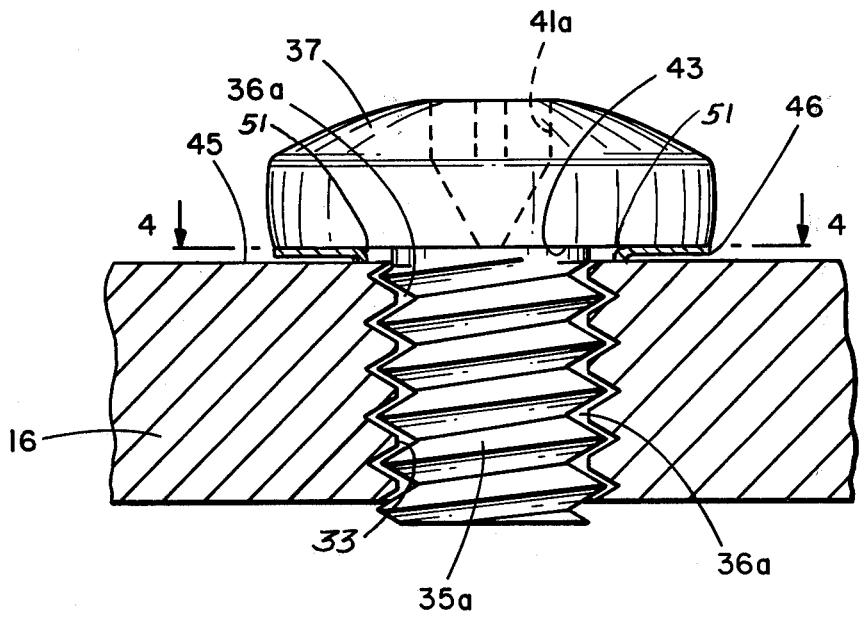
FIG. 3

GAS-DIFFUSION PLATE FOR FLUIDIZED BED APPARATUS

BACKGROUND OF THE INVENTION

Briefly, a fluidized bed consists of a mass of finely divided particles contained in a chamber through which a gas is passed. Usually the particles are heated. If the velocity of the gas entering the bed is properly adjusted, the particles separate and move about in a random manner such that the entire bed behaves like a liquid. Such apparatus is well known and its fundamental behaviour has numerous applications. A typical such bed is disclosed in U.S. Pat. No. 3,677,404 owned by the assignee of the present application. For optimum performance it is important that the gas be dispersed uniformly across the mass of particles contained in the chamber. In general this is accomplished by means of a plate having ports therethrough located at the bottom of the chamber and so constructed and arranged as to diffuse the gas flowing through the plate and into the bed. Uniformity is attained by having sufficient and approximately equal pressure drop resistance through each opening in the plate and by having the openings uniformly arranged in the plate to require approximately equal flow rates across the entire plate area. In addition to the requirement of uniformity, a suitable distributor plate must have the property of permitting little or no passage of particulate matter from above the distributor plate, against the flow of gas phase, to the plenum chamber volume below the distributor plate.

In a typical configuration, the fluidizing gas enters a plenum chamber generally co-extensive with the horizontal extent of the bed and for distribution over the area of the bed by means of a diffusion plate. The gas rises through the bed during which liquid-like behavior is imparted to the particulate medium. The spent gas exits through a flue at the top of the chamber.

A variety of diffusion plate configurations are in use, varying from a simple metallic plate with small holes drilled therethrough to more involved structures including bubble caps and perforate baffles, various pipe and capillary tube configurations, as well as such specialized material as porous metal plates and porous ceramics.

SUMMARY OF THE INVENTION

The present improvement comprehends improved adjustable ports through the plate which provide communication between the plenum chamber and the interior of the chamber, i.e., the mass of particles. A plurality of such means is desirably spaced uniformly over the useful area of the plate. Each of these ports comprises a hole bored through the plate which is tapped to receive a screw stud of some selected size depending on the capacity of the chamber and the predetermined pressure. The tap drill is oversize so that, when tapped, the thread in the plate has a pronounced flat crest, somehwat more than the flat crest of the American Standard V-thread. The stud has a complementary thread following conventional standards. Consequently, when the stud is assembled in its hole a helical passage is defined between the flanks of the thread on the stud and in the tapped hole and the flat crest of the thread in the tapped hole. Thus, the air originating from the plenum chamber passes through this helical passage in a swirling pattern with consequent improved diffusion through the bed. Various expedients may be employed to improve diffusion in accordance with the principles of the invention as will appear. In one important aspect, the improvements disclosed herein provide for reliable obstruction of particles tending to take the reverse path from the bed back to the plenum chamber by introducing a tortuous path of small cross sectional area.

In addition to regulation of the gas phase flow rate vs. pressure drop relationship by variation in the relative dimensions of the threaded hole and the stud engaged therein, the number of threads per inch and the thickness of the plate may be varied.

Another aspect of the invention resides in replacing the stud with a screw having a head and the introduction of a conventional internal lock washer under the head. The wings on the interior of the lock washer then act to define a plurality of ports through which the air moving through each port issues with enhanced velocity and is dispersed uniformly about the head of the screw.

BRIEF DESCRIPTION OF THE DRAWING

FIG. 1 is a diagrammatic representation of a basic fluidized bed apparatus;

FIG. 2 is a cross-sectional detail to show one form of the invention;

FIG. 3 shows an alternative embodiment thereof;

DESCRIPTION OF THE PREFERRED EMBODIMENTS

Figure 4:
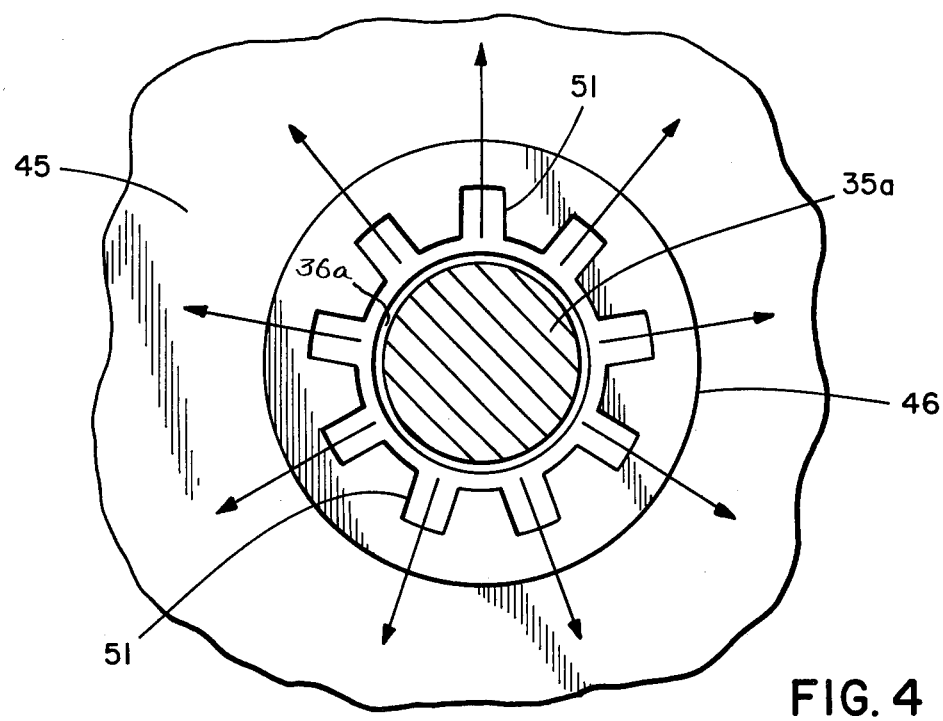
FIG. 4 is a cross section taken on the line 4—4 of FIG. 3.

Turning to FIG. 1 there is shown, in schematic form, a fluidized bed apparatus of a very basic type, sometimes termed a fluidized bed reactor. The mass 10 of particles, e.g. sand, is contained in a chamber 11 of any suitable construction and is supported on a bottom plate 14 provided with a plurality of ports 15 so designed as to permit flow of gas therethrough in a baffled manner to prevent particles from moving downwardly therethrough into a plenum chamber 17. Upward flow of gas, air, oxygen, nitrogen, or other is from the plenum chamber 17 through the ports 15, through the mass of particles 10 and out through a flue 21 to atmosphere or other means of disposal. Flow of gas is indicated by the arrows 22. For further particulars reference is made to U.S. Pat. No. 3,677,404, wherein a comparable reactor is shown at 21. The gas may be pre-heated prior to delivery to the chamber and the reactor may have electrical or other heating means (not shown) to maintain the mass of particles at some predetermined operating temperature.

The present application relates to improvements in the ports 15, a plurality thereof being shown although in some specialized equipment it is possible to have only one.

The plate 14 is generally of steel or equivalent having a thickness sufficient to support the mass 10 of particles without objectionable deformation.

In accordance with the invention and referring now to FIG. 2, the plate 14 is provided with one or more tapped holes 31, using an oversized tap drill. In the example, the tap has the American Standard V-thread, including a root 32, a crest 33 and flanks subtending an angle of 60°. As is recognized, in order to avoid the problems attendant on a sharp root and crest, this thread in its standard form is slightly truncated. For further particulars reference is made to Thomas E. French, Engineering Drawing, McGraw-Hill Book Company, Inc., New York, New York, Sixth Edition, pp. 209, 210. It will be understood that, in the example, the American Standard V-thread has been chosen primarily because tools for this form are readily available. However, other thread forms may be availed of, as shown on page 210 of the work cited.

The crest 33 of the female thread is wider than the standard and is most easily obtained by using a tap drill. Arranged to be engaged in the tapped hole 31 is a correspondingly threaded stud 35 having the American Standard V-form. Thus, when the stud is screwed into the hole the wide, flat crest 33 will define, with the neighboring flanks of the stud thread a helical passage 36. Thus, the gas is directed in a helical path from the plenum chamber 17, through the passage 36 to exit into the mass 10 of particles.

Notwithstanding truncation of the thread, as at 33, it is still possible to attain a tight fit between the plate 14 and stud 35 to preclude backing out of the latter under vibration. To reduce or extend the lengthof the helical passage 36, the stud is rotated clockwise or counterclockwise. For this purpose a recess 41 is provided in the stud. This may be a plain slot, Phillips or Allen recess or other.

A modified embodiment is depicted in FIGS. 3 and 4. In this case a helical passage 36a is constituted as before. However, the stud is now the shank 35a of a machine screw, the head whereof is indicated at 37 and the screwdriver recess at 41a. Interposed between the bottom face 43 of the head 37 and the upper surface 45 of the plate 16 is a standard form of internal lock washer 46. Reference is made to French, op cit., p. 225, FIG. 521 (E). The tangs 51 of the washer 46, being resilient, may be deformed by turning the screw in or out, to vary the space between the faces 43 and 45 and therefore the area available for discharge of the gas after the same has issued from the helical passage 36a. Further, the air issuing past the lock washer 46 is directed more or less in a horizontal plane whereby agitated particles are precluded from entering the voids defined by the screw, plate and washer. Stated otherwise, gravity is relatively ineffective to bias the particles reversely into the helical passage 36a to clog the same.

Figure 5:
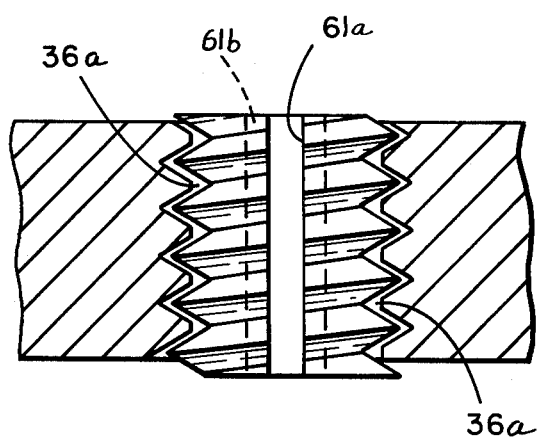
FIG. 5 shows still other embodiments of the invention which, for convenience, are grouped in a single figure.
Figure 6:
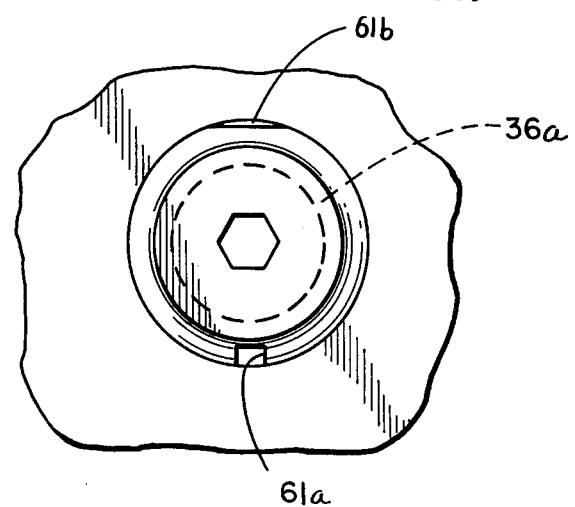
FIG. 6 is a top plan view of the device of FIG. 5.

FIGS. 5 and 6 illustrate an embodiment in which a minimum basic flow path is provided by a longitudinal passage 56 which may be a recess 56 or a flat 55 as shown. For conciseness of exposition both expedients are included in the one figure. In practice one or the other or some equivalent passage will be used so long as flow therethrough is at some minimum rate. At this juncture it will have become clear that the pressure drop across the partition 14 for a known rate of flow of gas through the partition is critical and that adjustment thereof is accomplished by selection of the cross section of the recess 56 or flat 55, and that finer adjustment is the result of turning the stud or screw in or out. If this latter adjustment is carried too far the thread may be stripped, having in mind that the threaded engagement is deliberately made snug in order to maintain a selected position notwithstanding vibration. By employing the axial path provided by the recess 56 or flat 55 the greater part of the volume of flow occurs therethrough and damage to the stud or screw or its companion threaded hole is precluded.

In lieu of employing the recess or flat on the screw one may provide the recess or flat on the interior of the hole; i.e. the female thread can contain the flat section or recess to provide the additional flow area.

The reference to American Standard V-thread is not to be understood in a literal sense. This description is intended to avoid restriction to a thread which has a sharp root and crest for the reasons stated above. The truncation required to define the helical passage for gas flow will be somewhat wider, measured axially, than the standard, which is one-eighth of the pitch.

We claim:

1. A fluidized bed reactor including a diffusion plate, said plate having a plurality of ports therethrough to provide for a plurality of flows of gas through said ports from one side of said plate to the other side thereof, wherein each of said ports comprises a threaded hole, the crests of said threads being truncated, threaded means individual to each of said ports rotatably engaged with a respective one of the threaded holes for axial adjustment within the individual port to define with the respective threaded hole an adjustable helical path for said flow of gas through said plate, the threaded means defining, with the surface of said other side of said plate, passage means to discharge the gaseous flow from each of the ports in a laterally, outwardly-directed path, said threaded means comprises a plurality of machine screws, one individual to each port and each having a head and shank and a lock washer received over the shank, said washer having a plurality of circumferentially spaced resilient tangs to adjustably position and secure said head in spaced relation with the said surface of said other side of said plate to define a plurality of channels beneath said head for gaseous flow in a plurality of radially and outwardly directed, substantially horizontal, gaseous streams across said surface.

2. The improvement according to claim 1 further comprising means coacting with at least one of said port and its said threaded means to provide a separate path for an additional flow of at least a minimum rate of flow of said gas through said port, said additional flow path being parallel to the axis of said port and independent of said helical path.

3. The improvement according to claim 2 wherein said means comprises a longitudinal passage intersecting the threads of said port and having a transverse cross section preselected to provide a predetermined pressure drop across the said surface of said other side of said plate proportional to the rate of flow of the gas.

4. The improvement according to claim 3 wherein said passage is formed in said threaded means.

* * * * *